United States Patent [15] 3,688,005
Pines [45] Aug. 29, 1972

[54] 5-HALO-BICYCLO[2,2,2]OCT-2-ENE-1,4-DICARBOXYLIC ACID

[72] Inventor: Seemon H. Pines, 24 Candlewood Drive, Murray Hill, N.J. 07974

[22] Filed: March 13, 1969

[21] Appl. No.: 807,082

[52] U.S. Cl.......260/468 B, 260/78 UA, 260/78.4 E, 260/464, 260/514 B, 260/544 L, 260/557 B
[51] Int. Cl..........................C07d 61/28, C07c 69/74
[58] Field of Search.............................260/468, 514

[56] References Cited

UNITED STATES PATENTS 3,526,657   9/1970   Loeffler....................260/514

OTHER PUBLICATIONS

Kaver et al., J.O.C.S. 30 1,431, 1965

*Primary Examiner*—Lorraine A. Weinberger
*Assistant Examiner*—Robert Gerstl
*Attorney*—I. Louis Wolk, Harry E. Westlake, Jr. and Francis H. Deef

[57]           ABSTRACT

A new class of 1,4,5 (or 6)-trisubstituted bicyclo[2,2,2]ct-2-ene compounds are prepared by reacting a 1,4-disubstituted 2,3-dihydrobenzene with a substituted vinyl compound. The derivatives are polycarboxylic acids, or can be hydrolyzed to polycarboxylic acids, and are suitable for use in condensation polymers such as polyamides and polyesters.

3 Claims, No Drawings

5-HALO-BICYCLO[2,2,2]OCT-2-ENE-1,4-DICARBOXYLIC ACID

The present invention relates to a novel and useful class of compounds. More particularly, it relates to the preparation of bicyclo[2,2,2]oct-2-ene compounds which are suitable for use as intermediates.

It is known in the art that 2,3-dihydroterephthalic acid can be reacted with ethylene to give a bicyclo[2,2,2]-ene-1,4-dicarboxylic acid, which compounds are useful in preparing polyesters and polyamides. See U.S. Pat. No. 3,081,334. However, the process is limited to the use of ethylene and the products contain only two substituent groups. It has now been found that by using a substituted vinyl compound a trisubstituted final product is obtained.

It is an object of the present invention to provide a new class of intermediate compounds. A further object is to provide a process for forming such compounds. Another object is to provide intermediates which are polycarboxylic acids or can be converted to polycarboxylic acids which can be utilized in the formation of polyesters and polyamides. A still further object is to provide intermediate products which can be converted into pharmaceutical products. Other objects will become apparent as the description of the invention proceeds.

These objects are accomplished by the present invention which provides compounds of the formula

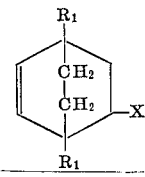

wherein each $R_1$ is selected from the group consisting of $-COOR_2$, $-CN$, $-COhalide$ and $-CON(R_2)_2$; and X is selected from the group consisting of halogen, lower alkoxy, $-CN$, lower alkanoyl, $-CHO$,

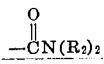

and $-COOR_2$ with each $R_2$ being H or lower alkyl.

In a preferred embodiment of the present invention X is halogen, preferably chlorine or bromine, and $R_1$ is the carbomethoxy group.

The present invention also provides a process for preparing compounds of the formula

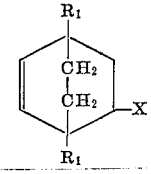

which comprises reacting, at a temperature above about 100°C., a dihydrobenzene compound of the formula

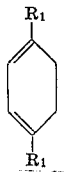

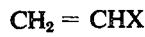

with a vinyl compound of the formula $$CH_2 = CHX$$

wherein each $R_1$ is selected from the group consisting of $-COOR$, $-CN$, $-COhalide$ and $-CON(R_2)_2$; and X is selected from the group consisting of halogen, lower alkoxy, $-CN$, lower alkanoyl, $-CHO$,

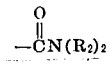

and $-COOR_2$ with each $R_2$ being H or lower alkyl.

In carrying out the process of the present invention, a solvent is generally not required since many of the reactants are liquids. However, in some instances a solvent is desired and it may be selected at will providing that it is inert to the reactants and stable under the reaction conditions. Such solvents include, without limitation, xylene, diphenyl ether, o-dichlorobenzyl, diethylene glycol diethyl ether, dioxane and the like.

The reaction is generally carried out at a temperature above about 100°C. and below about 280°C. although these limits may be varied somewhat. A more preferred temperature range is from about 150°C. to about 220°C. depending on the reactants. Most of the reactants react at a temperature of from 165°C. to 195°C. and this temperature is generally employed. The reaction is generally quite slow and may take a few hours to several days to obtain desirable yields. While the reaction may be carried out under any pressure conditions, it is preferred that it be carried out under autogeneous pressure so that none of the reactants are lost. Generally, a sealed bomb type of reactor is used.

Catalysts are not required for the reaction but may be used if desired. In general, Lewis acid catalysts such as boron trifluoride and zinc chloride would be used.

Among the various dihydrobenzene compounds which may be utilized in the practice of the present invention are 1,4-dicarboxy-2,3-dihydrobenzene, 1,4-dicarbomethoxy-2,3-dihydrobenzene, 1-chlorocarbonyl-4-carbomethoxy-2,3-dihydrobenzene, 1-carboxamido-4-carbomethoxy-2,3-dihydrobenzene, 1-(N-benzyl)carboxamido-4-carbomethoxy-2,3-dihydrobenzene, 1,4-dicarboxamido-2,3-dihydrobenzene and the like. The vinyl compounds which may be used include, without limitation, vinyl bromide, vinyl chloride, acrylonitrile, vinyl acetate, acrylamide, methyl acrylate, acrylic acid, acrolein and the like.

The products prepared in accordance with the present invention can be easily hydrolyzed to polycarboxylic acids which are useful in preparing polyamides, i.e. nylons and polyesters, i.e. alkyd resins. The compounds are particularly useful for modifying the properties of the polyamides and polyesters of U.S. Pat. No. 3,081,334 by the replacement of a portion of the acid in the patent with one or more of the acids which can be produced by the present invention. The compounds of the present invention are also useful as plasticizers for natural and synthetic resins, particularly the polyesters and polyamides.

The following examples are given to illustrate the invention and are not intended to limit it in any manner. All parts are given in parts by weight unless otherwise expressed.

EXAMPLE 1

Procedure A

100 Mg. of 1,4-dicarbomethoxy-2,3-dihydrobenzene is placed in a heavy-walled glass tube with 5 mg. of hydroquinone (to inhibit polymerization) and 1 ml. of vinyl bromide. The tube is sealed and placed within a protective steel autoclave. The reactants are heated at 180°C. for 72 hours and then cooled. The mixture is removed and the excess vinyl bromide is evaporated leaving 1,4-dicarbomethoxy-5-bromo-bicyclo[2,2,2]oct-2-ene.

Procedure B

The product of Procedure A is hydrolyzed by dissolving 10 millimoles of the product in 50 ml. of ethanol with 20 millimoles of sodium hydroxide. The solution is refluxed for one hour and then acidified to Congo Red with dilute hydrochloric acid. The 5-bromo-bicyclo[2,2,2]oct-2-ene-1,4-dicarboxylic acid crystallizes from solution. It can be used to form polyesters and polyamides as shown in U.S. Pat. No. 3,081,334.

Procedure C

10 Millimoles of the product of Procedure A is dissolved in 30 ml. of a mixture of ethanol and 1 N potassium hydroxide (1:1 ratio) and hydrogenated at 40 psig over 500 mg. of 10 percent Pd. on barium sulfate. When two equivalents of hydrogen have been absorbed, the pressure is released and the catalyst filtered from the solution. The solution is heated at 60°C. for an additional hour and then cooled. The solution is then acidified to Congo Red with dilute hydrochloric acid and the product crystallizes therefrom. The product is bicyclo[2,2,2]octane-1,4-dicarboxylic acid. The saturated dicarboxylic acid can also be used to form the polyesters and polyamides of U.S. Pat. No. 3,081,334.

EXAMPLE 2

5 Grams of 1,4-dicarbomethoxy-2,3-dihydrobenzene is mixed with 10 ml. of acrolein, 50 mg. of hydroquinone (to inhibit polymerization) and 35 ml. of xylene and placed in a heavy glass tube which is sealed. The mixture is heated in the sealed tube at 170°C. for 17 hours. The tube is cooled. The solution remaining in the tube is combined with a chloroform extract of the polymeric residues and chromatographed to give a liquid having the structural formula

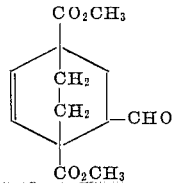

EXAMPLE 3

5 Grams of 2,3-dihydroterephthalic acid is mixed with 20 ml. of ethyl vinyl ether and 200 mg. of hydroquinone (to inhibit polymerization) in 100 ml. of dioxane in a stainless steel autoclave. The autoclave is sealed and heated to 180°C. for 18 hours. After cooling, the volatile compounds are evaporated and the residue dissolved in aqueous sodium bicarbonate. The solution is filtered and then neutralized with dilute hydrochloric acid to give a mixture of the starting material 2,3-dihydroterephthalic acid and 1,4-dicarboxy-5-ethoxy-bicyclo[2,2,2]oct-2-ene. The two compounds are separated by chromatography on silica gel. The final product may be used directly for the formation of polyesters and polyamides.

EXAMPLE 4

100 Mg. of 1-cyano-4-carbomethoxy-2,3-dihydrobenzene is placed in a heavy-walled glass tube with 5 mg. of hydroquinone. The tube and contents are cooled to −70°C. and 3 grams of vinyl chloride are condensed in the tube which is then sealed. The sealed tube is then placed in a protective steel container which is pressurized with nitrogen at 500 psig. The tube is then heated for 48 hours at 170°C.. After cooling, the contents of the glass tube are chromatographed on alumina to give a mixture of the two isomers 1-cyano-4-carbomethoxy-5-(and 6)-chloro-bicyclo [2,2,2]oct-2-ene.

EXAMPLE 5

The procedure of Example 4 is repeated employing an equivalent amount of 1-(N-benzyl)-carboxamido-4-carboxymethyl-2,3-dihydrobenzene in place of the 1-cyano-4-carbomethoxy-2,3-dihydrobenzene. After being chromatographed on alumina, the product is a mixture of the compounds 1-(N-benzyl)-carboxamido-4-carbomethoxy-5-(and 6)-chloro-bicyclo[2,2,2]-oct-2-ene.

EXAMPLE 6

Procedure A

The procedure of Example 4 is repeated employing 100 mg. of 1,4-di(chlorocarbonyl)-2,3-dihydrobenzene. The final product is 1,4-di(chlorocarbonyl)-5-chloro-bicyclo-[2,2,2]oct-2-ene.

Procedure B

The product from Procedure A can be hydrolyzed by refluxing for 1 hour in 5 ml. of water which is then evaporated to dryness to give 1,4-dicarboxy-5-chloro-bicyclo[2,2,2]oct-2-ene.

EXAMPLE 7

Procedure A

The procedure of Example 2 is repeated employing methyl acrylate rather than acrolein. The resulting product is 1,4,5-tricarbomethoxy-bicyclo[2,2,2]oct-2-ene.

Procedure B

The product of Procedure A is hydrolyzed by refluxing it with 35 millimoles of sodium hydroxide in 50 ml. of a methanol/water (80/20) mixture. After 1 hour at reflux the methanol is removed in vacuo and the residue taken up in water. The solution is acidified with dilute hydrochloric acid to Congo Red to give the product 1,4,5-tricarboxy-bicyclo[2,2,2]oct-2-ene. The poly functional acid may be utilized in the formation of alkyd resins.

I claim:

1. Compounds of the formula

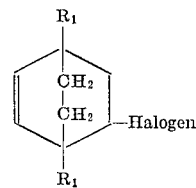

wherein each $R_1$ is —$COOR_2$ with each $R_2$ being hydrogen or lower alkyl.

2. Compounds of the formula

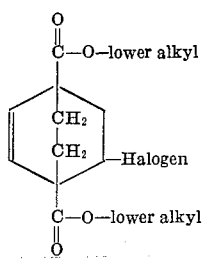
3. 1,4-Dicarbomethoxy-5-bromo-bicyclo[2,2,2]oct-2-ene.
* * * * *